US 8,407,552 B2

(12) United States Patent
Rigaudeau et al.

(10) Patent No.: US 8,407,552 B2
(45) Date of Patent: Mar. 26, 2013

(54) METHOD BASED ON ERROR CORRECTOR CODES, APPLICABLE TO A VARIABLE RATE MULTIMEDIA DATASTREAM

(75) Inventors: Serge Rigaudeau, Pleumeur Bodou (FR); Jerome Crestel, Lannion (FR)

(73) Assignee: France Telecom, Paris (FR)

( * ) Notice: Subject to any disclaimer, the term of this patent is extended or adjusted under 35 U.S.C. 154(b) by 531 days.

(21) Appl. No.: 12/665,610

(22) PCT Filed: Jun. 18, 2008

(86) PCT No.: PCT/FR2008/051086
§ 371 (c)(1),
(2), (4) Date: Dec. 18, 2009

(87) PCT Pub. No.: WO2009/004248
PCT Pub. Date: Jan. 8, 2009

(65) Prior Publication Data
US 2010/0153814 A1 Jun. 17, 2010

(30) Foreign Application Priority Data
Jun. 19, 2007 (FR) ...................................... 07 55869

(51) Int. Cl.
*H30M 13/00* (2006.01)
(52) U.S. Cl. ........................................................ 714/752
(58) Field of Classification Search .................. 714/752; 375/213, 224–228
See application file for complete search history.

(56) References Cited

U.S. PATENT DOCUMENTS

| 7,877,061 | B2 * | 1/2011 | Klein et al. | ................. | 455/63.1 |
| 8,327,216 | B2 * | 12/2012 | Abu-Surra | ................. | 714/752 |
| 2003/0091098 | A1 * | 5/2003 | Manninen et al. | ............ | 375/133 |
| 2006/0279437 | A1 * | 12/2006 | Luby et al. | ...................... | 341/50 |

(Continued)

FOREIGN PATENT DOCUMENTS
FR EP 2088708 * 8/2008
WO 0139505 A2 3/2001

OTHER PUBLICATIONS

Mochizuki, Konomi et al.: "Forward Error Correction for Visual Communication Systems Using VBR Codec", Special Section on Multimedia QoS Evaluation and Management technologies, IEICE Transactions on Communications Society, Tokyo, JP, vol. E89-B, No. 2, Feb. 2006, pp. 334-341.

(Continued)

*Primary Examiner* — Amine Riad
(74) *Attorney, Agent, or Firm* — David D. Brush; Westman, Champlin & Kelly, P.A.

(57) ABSTRACT

A method and apparatus are provided for creating a matrix for correcting errors of transmission of multimedia data packets at a non-constant rate between a sender terminal and at least one receiver terminal. The multimedia data packets constitute elements of the correction matrix. The correction matrix has dimensions that are determined as a function of a maximum rate of the multimedia data packets at the input of the sender terminal, and the multimedia data packets are placed in the correction matrix at regular time slots. A noted absence of any multimedia data packets for a given time slot is represented in the correction matrix by an empty location.

15 Claims, 2 Drawing Sheets

U.S. PATENT DOCUMENTS

| | | | |
|---|---|---|---|
| 2007/0064707 A1 | 3/2007 | Pandel et al. | |
| 2009/0055705 A1* | 2/2009 | Gao | 714/755 |
| 2009/0245401 A1* | 10/2009 | Chrabieh et al. | 375/260 |
| 2009/0259917 A1* | 10/2009 | Spencer | 714/758 |
| 2010/0103001 A1* | 4/2010 | Shokrollahi et al. | 341/94 |
| 2011/0158337 A1* | 6/2011 | Li et al. | 375/260 |
| 2012/0177138 A1* | 7/2012 | Chrabieh et al. | 375/260 |

OTHER PUBLICATIONS

"Transmission of Professional MPEG-2 Transport Streams Over IP Networks", Pro-MPEG Forum, Pro-MPEG Code of Practice #3 release 2, Jul. 2004. <http://62.73.167.57/publications/pdf/Vid-on-IP-CoP3-issue1.pdf>.

* cited by examiner

METHOD BASED ON ERROR CORRECTOR CODES, APPLICABLE TO A VARIABLE RATE MULTIMEDIA DATASTREAM

CROSS-REFERENCE TO RELATED APPLICATIONS

This Application is a Section 371 National Stage Application of International Application No. PCT/FR2008/051086, filed Jun. 18, 2008 and published as WO 2009/004248 on Jan. 8, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of telecommunications, and more particularly in the field of the transmission of multimedia data streams.

BACKGROUND OF THE DISCLOSURE

In a communication network of packet type, such as an IP (Internet Protocol) network for example, the transmission of multimedia data streams, taking the form of multimedia data packets, between a sender terminal emitting a multimedia data stream and one or more receiver terminals may be impaired in the event of malfunction of equipment belonging to the network (such as routers), of disruption of transmission, etc. This impairment is manifested by the loss of one or more multimedia data packets exchanged between the sender terminal and the receiver terminal, which loss gives rise to a degradation in the quality of service.

A mechanism is known for correcting errors occurring during the transmission of multimedia data packets, which regenerates at the level of the receiver terminal lost multimedia data packets with the aid of correction data packets. This is the so-called error correction or Forward Error Correction (FEC) technique. An exemplary implementation of such a technique is defined in the document Code of Practise #3 release 2 from the Pro MPEG (Moving Picture Experts Group) Forum.

Such a mechanism is used in particular when the receiver terminal has no return pathway for communication with the sender terminal. Indeed, in this case the use of a retransmission protocol such as the TCP/IP (Transmission Control Protocol/Internet Protocol) or RTP/RTCP (Real-time Transport Protocol/Real-time Transport Control Protocol) protocols is impossible.

Indeed, in such a configuration the receiver terminal cannot inform the sender terminal of the non-receipt of certain multimedia data packets, thus prohibiting any resending of the lost packets. Such is the case with streams of multimedia data packets broadcast to a plurality of receiver terminals able to receive them, an example may be DTT (Digital Terrestrial Television) streams.

A scheme based on error correcting codes such as the one proposed by the Pro MPEG Forum consists, at the sender terminal level, in creating a transmission errors correction matrix. The multimedia data packets are placed in the correction matrix as they are generated, each multimedia data packet being identified by a sequence number stored in its RTP header. Two multimedia data packets generated consecutively, and therefore adjacent in the correction matrix, are identified by two consecutive sequence numbers.

Once the correction matrix has been completed, correction data packets are generated on the basis of groups of multimedia data packets. Such groups correspond, for example, to multimedia data packets constituting rows or columns of the correction matrix.

The correction data packets thus generated form a redundancy of the data of the multimedia data packets constituting the groups of multimedia data packets on the basis of which they are generated.

Such correction data packets also comprise information making it possible to reconstruct the correction matrix at the level of the receiver terminal.

The multimedia data packets and the correction data packets are thereafter sent to the receiver terminal or terminals. These two types of data packets form the subject of different data streams so as to allow receiver terminals which are not able to implement this error corrector based scheme to be able nevertheless to utilize the stream of multimedia data packets.

It is therefore necessary to reserve additional bandwidth so as to ensure the forwarding of the correction data packets, the stream of these packets generating an overhead.

Such an overhead is fixed as a function of the size of the correction matrix. The overhead engendered by the stream of correction data packets is defined by the ratio between the number of multimedia data packets constituting the correction matrix and the correction data packets associated with this same correction matrix. The dimensions of the correction matrix being fixed, the value of the overhead is constant.

On receipt of the multimedia data packets and correction data packets, the receiver terminal reconstructs the correction matrix. Each multimedia data packet received is placed in the correction matrix thus reconstructed at the location which it had in the original correction matrix by means of its sequence number and of additional information contained in the correction data packets.

The loss of a multimedia data packet is manifested in the reconstructed correction matrix by an empty location just where the lost multimedia data packet ought to be situated. The lost multimedia data packet is reconstructed with the aid of one or more correction data packets corresponding to the row and/or the column of the original correction matrix to which the lost multimedia data packet belongs.

Such a scheme applies mainly to constant rate or CBR (Constant Bit Rate) streams of multimedia data packets. The multimedia data packet stream rate being constant, the dimensions of the correction matrix, which are defined as a function of this rate, are constant, the correction matrix is consequently a matrix of fixed size. In an indicative case such as this, the duration necessary to generate the correction data packets, which duration corresponds to the duration necessary to complete the correction matrix, and to carry out the correction of the multimedia data packet stream received by the receiver terminal, is constant. Likewise, the latency introduced by the application of this scheme to correct a multimedia data stream is constant. The maximum number of lost multimedia data packets exhibiting consecutive sequence numbers which can be corrected by applying this scheme is also constant.

When the scheme based on error correcting codes is applied to non-constant rate or VBR (Variable Bit Rate) multimedia data streams, the dimensions of the correction matrix are determined as a function of the mean rate of the multimedia data packet stream for example. The dimensions of the correction matrix then remain fixed until the end of transmission of the stream of multimedia data packets. Likewise, the value of the overhead engendered by the stream of correction data packets is constant.

When the multimedia data packet stream rate varies, the correction matrix is, in most cases, either under-dimensioned or overdimensioned with respect to the actual value of the multimedia data packet stream rate.

In the indicative case where the correction matrix is under-dimensioned with respect to the multimedia data packet stream rate, the number of rows of the matrix is less than the maximum number of consecutively generated multimedia data packets which must be able to be corrected for such a multimedia data packet stream rate. Thus when a number of multimedia data packets is equal to the maximum number of consecutively generated multimedia data packets that can be corrected, these multimedia data packets occupy more than one row of the correction matrix. If all these multimedia data packets are lost during transmission, as they occupy more than one row of the correction matrix, certain columns of the correction matrix exhibit more than one empty location. It then becomes impossible for these columns to regenerate the lost multimedia data packets with the aid of the correction data packets.

This gives rise to a loss of effectiveness of the correction applied with a view to regenerating the multimedia data packets lost during transmission since it is not possible to regenerate them all.

In the indicative case where the correction matrix is over-dimensioned with respect to the multimedia data packet stream rate, the duration of filling of a matrix is longer than if the dimensions of the correction matrix were tailored to the multimedia data packet stream rate. Thus the time needed for the application of the scheme based on error corrector codes is, in most cases, much longer with an overdimensioned matrix than with a matrix tailored to the multimedia data packet stream rate.

This increase in the time needed for the application of the scheme based on error corrector codes is incompatible with the quality of service requirements of services for broadcasting audiovisual data streams, such as the time interval needed by a user receiving the streams of multimedia data packets to switch from one stream to another.

Thus, it is apparent that the application of the scheme based on error correcting codes to a multimedia data stream with non-constant rate gives rise to loss of effectiveness of correction and an increase in the processing time intervals which are prejudicial to the quality of the service delivered to the users receiving the streams of multimedia data packets. Such drawbacks make the use of this scheme unsuitable for correcting multimedia data packet streams at non-constant rate.

With multimedia data packet stream broadcasting at non-constant rate tending to expand, there consequently exists a growing requirement among telecommunications operators for a scheme based on error correcting codes allowing the processing of multimedia data streams at non-constant rate which does not exhibit such drawbacks.

SUMMARY

An aspect of the disclosure relates to a method of creating a matrix for correcting errors of transmission of multimedia data packets at non-constant rate between a sender terminal and at least one receiver terminal, said multimedia data packets constituting elements of said correction matrix.

Such a method of creating a matrix for correcting transmission errors is particular in that the correction matrix has dimensions which are determined as a function of a maximum rate of said multimedia data packets at the input of said sender terminal, and in that said multimedia data packets are placed in the correction matrix at regular time slots, a noted absence of any multimedia data packets for a given time slot being represented in said correction matrix by an empty location.

By dimensioning the correction matrix as a function of the maximum rate that can be attained by the multimedia data packets at the input of the sender terminal, so that said matrix exhibits a fixed size whatever the actual rate of the multimedia data packets, the ability to process all the multimedia data packets to be sent is ensured. The multimedia data packets are generated by a sending device, such as a video stream encoder. The output of this device for sending the stream of multimedia data packets is connected as input to the sender terminal.

In order to take rate fluctuations into account, the multimedia data packets are placed in the matrix at regular time slots. The duration of this time slot must be less than or equal to the duration separating the receipt by the receiver terminal of two multimedia data packets sent consecutively by the sending device when the rate at the input of the sender terminal is a maximum. Thus, at each time slot a multimedia data packet is placed in the correction matrix. If in the course of a time slot, no multimedia data packet is generated, the location provided in the correction matrix for this multimedia data packet is left empty. One proceeds in this way until the correction matrix is completely filled. The correction matrix thus obtained is termed a "voids matrix" since the absence of multimedia data packets results in an empty hole in the correction matrix.

By dimensioning the matrix as a function of the maximum rate of the multimedia data packets and by taking into account the variations of this rate during the creation of the matrix, everything happens as if the stream of processed data packets had a constant rate. Such a method makes it possible, consequently, to apply the error correcting codes scheme to a stream of multimedia data packets at non-constant rate without being confronted with the drawbacks of the prior art.

According to a particular feature of the creation method which is the subject of an embodiment of the invention, it comprises a step of generating correction data packets on the basis of said multimedia data packets placed in said correction matrix, and a step of sending at least one message comprising at least one of said correction data packets and an indication about the empty locations and an indication about the location of said multimedia data packets in the correction matrix.

Such a message consists of one or more correction data packets. The indications about the location of the empty locations in the correction matrix as well as the indications about the location of the multimedia data packets in the correction matrix are contained in the header of the correction data packets constituting the second message.

According to a particular feature of the creation method which is the subject of an embodiment of the invention, it comprises a step of generating correction data packets on the basis of said multimedia data packets placed in said correction matrix, a step of sending at least one first message comprising at least one of said correction data packets and an indication about the empty locations in the correction matrix and a step of sending at least one second message comprising at least one of said multimedia data packets and an indication about the location of said at least one multimedia data packet in the correction matrix.

Such a second message consists of one or more multimedia data packets. The indications about the location of the multimedia data packets in the correction matrix are contained in the header of the packets of these multimedia data.

In this embodiment, the first message now comprises only the correction data packets and the indications about the location of the empty locations in the correction matrix.

The implementation of this embodiment gives rise to a modification of the RTP header of the multimedia data packets.

According to another particular feature of the method of creating a correction matrix which is the subject of an embodiment of the invention, when several multimedia data packets are sent in one and the same time slot, said multimedia data packets are placed simultaneously in adjacent locations of the correction matrix.

This characteristic makes it possible to manage the sending of multimedia data packets in bursts. Such a situation arises when there is a sudden variation in the rate of the multimedia data packets.

An embodiment of the invention also relates to a method of reconstructing a matrix for correcting errors of transmission of multimedia data packets at non-constant rate between a sender terminal and at least one receiver terminal, said method comprising a step of placing said multimedia data packets so as to reconstruct said correction matrix.

Such a method of reconstructing a correction matrix comprises, prior to the placing step, a step of reception by said receiver terminal of at least one message comprising an indication about the location of the multimedia data packets and an indication about empty locations corresponding to an absence of multimedia data packets in the correction matrix.

According to a particular feature of the reconstruction method which is the subject of an embodiment of the invention, said message received also comprises at least one correction data packet, said correction data packet being generated on the basis of the multimedia data packets sent by the sender terminal.

According to another particular feature of the reconstruction method which is the subject of an embodiment of the invention, during the reception step, the receiver terminal receives a first message comprising at least one correction data packet, said correction data packet being generated on the basis of the multimedia data packets sent by the sender terminal, and an indication about the empty locations in the correction matrix, and a second message comprising at least one of said multimedia data packets and an indication about the location of said at least one multimedia data packet in the correction matrix.

With the aid of the information contained in the message or messages, as well as of the dimensions of the correction matrix, the receiver terminal is capable of reconstructing the correction matrix. The dimensions of the correction matrix are known to the receiver terminal by reading the header of the correction data packets in accordance with what is defined in the Code of Practise #3 release 2.

Once it has identified the empty elements corresponding to multimedia data packets lost by detecting a sequence break in the sequence numbers identifying the multimedia data packets and with the aid of the indications about the empty locations, the receiver terminal undertakes their reconstruction with the aid of the correction data packets. The benefit of these first and second messages sent following the creation of the correction matrix is therefore seen.

An embodiment of the invention also relates to a sender terminal emitting multimedia data packets at non-constant rate, said sender terminal comprising means for creating a matrix for correcting errors of transmission of the multimedia data packets between said sender terminal and at least one receiver terminal, said multimedia data packets constituting elements of said correction matrix.

Such a sender terminal is particular in that it comprises, furthermore, means for determining the dimensions of the correction matrix as a function of a maximum rate of said multimedia data packets, and means for placing said multimedia data packets in the correction matrix at regular time slots, the absence of data packets resulting in an empty location in said correction matrix.

An embodiment of the invention also relates to a receiver terminal receiving multimedia data packets at non-constant rate, said receiver terminal comprising means for reconstructing a matrix for correcting errors of transmission of said multimedia data packets between a sender terminal and said receiver terminal, said receiver terminal also comprising means for placing said multimedia data packets so as to reconstruct said correction matrix.

Such a receiver terminal is particular in that it comprises, furthermore, means for receiving at least one first message comprising an indication about the location of the multimedia data packets, and an indication about empty locations corresponding to an absence of multimedia data packets in the correction matrix.

An embodiment of the invention further relates to a first signal intended to be transmitted between a sender terminal and at least one receiver terminal. Such a first signal is a carrier bearing a message comprising an indication about a location of elements and an indication about empty locations corresponding to an absence of elements in a matrix for correcting errors of the transmission of multimedia data packets at non-constant rate between the sender terminal and the receiver terminal, said multimedia data packets constituting the elements of said correction matrix.

BRIEF DESCRIPTION OF THE DRAWINGS

Other characteristics and advantages will become apparent on reading preferred embodiments described with reference to the drawings in which.

DETAILED DESCRIPTION OF ILLUSTRATIVE EMBODIMENTS

Figure 1:
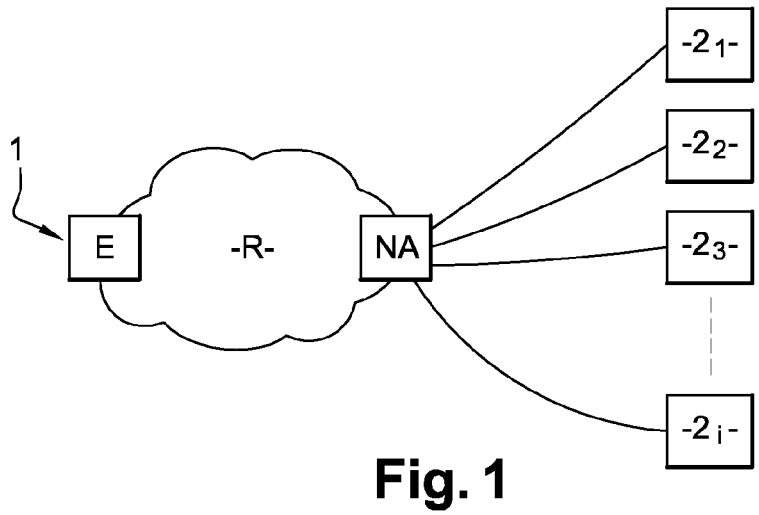
FIG. 1 illustrates in a schematic manner a multimedia data packet stream broadcasting system in which an embodiment of the invention is implemented, FIG. 2 describes an operating algorithm of the method of creating a correction matrix according to an embodiment of the invention, FIG. 3 describes an operating algorithm of the method of reconstructing a correction matrix according to an embodiment of the invention, FIG. 4 schematically illustrates a sender terminal in which an embodiment of the invention is implemented, FIG. 5 schematically illustrates a receiver terminal in which an embodiment of the invention is implemented.

FIG. 1 represents a broadcasting system in which an embodiment of the invention is implemented. In this figure, a sender terminal 1 broadcasts streams of multimedia data packets at non-constant rate to a plurality of receiver terminals $2_i$, $i \in \{1, \ldots, N\}$, through a telecommunications network R. Such a telecommunications network is a network of packet type without guarantee of forwarding, such as an IP network, and may be wire-based, or a radiofrequency network. The receiver terminals $2_i$, are connected to the network R by means of an access node NA, consisting for example of a DSLAM (Digital Subscriber Line Access Multiplexer) when terminal segments 10 that is to say the segments linking the access node to the receiver terminals $2_i$, use an xDSL (Digital Subscriber Line) technology, to offer the users a high-rate connection. Other technologies can be used on the terminal segments such as WIFI or else Ethernet.

Such technologies exhibit sensitivity to impulsive noise, resulting in a loss of the transmitted data. In the case of a stream of multimedia data packets, the loss of a multimedia data packet is manifested as a degradation of the quality of service such as for example pixelization of the image when the data contained in the packets are video data.

Figure 2:
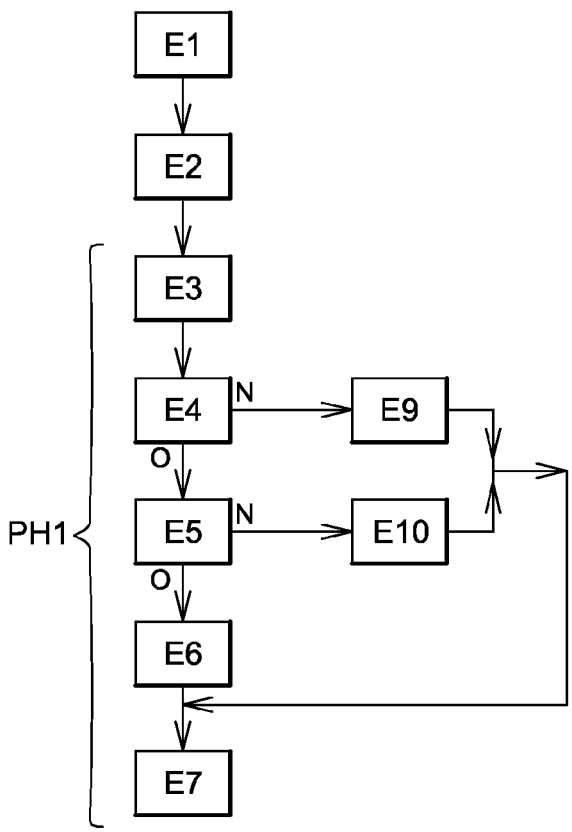

In order to solve the problem of loss of multimedia data packets, the sender terminal 1 implements a method of creating a matrix for correcting transmission errors M whose elements consist of the multimedia data packets, enabling the application of the error correcting codes scheme to the processing of multimedia data packets at non-constant rate. Such a method is described with reference to FIG. 2.

In the course of a first step E1, the dimensions of the correction matrix M, namely the number of rows and the number of columns that it comprises, are determined as a function of a maximum rate at which the multimedia data packets can be received at the input of the sender terminal 1. Once obtained, the dimensions of the correction matrix M are fixed.

In the course of a step E2, the value of a time slot Δt corresponding at most to the time interval separating the generation, by a sending device (not represented in the figures) of two consecutive multimedia data packets when the rate at which the multimedia data packets are sent is a maximum, is determined and stored in a counter. The output of the sending device is connected as input to the sender terminal 1 so that the rate at which the multimedia data packets are sent is identical to the rate of the multimedia data packets at the input of the sender terminal 1.

When the dimensions of the correction matrix M and the value of the time slot Δt have been determined, a phase PH1 of creating the correction matrix is implemented. This phase groups together steps E3 to E7, as well as steps E9 and E10.

In the course of step E3, the value indicated by the counter is tested. If the value logged is a multiple of the value of the time slot Δt then, the method executes step E4, otherwise, the value indicated by the counter is tested until it corresponds to a multiple of the value of the time slot Δt.

In the course of step E4, means for placing multimedia data packets belonging to the sender terminal 1 check to verify that at least one multimedia data packet is received by the sender terminal 1. If no multimedia data packet is received by the sender terminal 1 an empty location is left in the correction matrix M, this corresponds to step E9.

If at least one multimedia data packet is received by the sender terminal 1, the placing means of the sender terminal 1 determine the number of multimedia data packets received from the sending device. If a single multimedia data packet has been received, the method of creating the correction matrix M then executes step E6 in the course of which the multimedia data packet received is placed in the correction matrix M.

If more than one multimedia data packet is received, the method of creating the correction matrix M executes step E10. In the course of this step, the data packets thus received are placed at adjacent locations in the correction matrix M.

In a first embodiment of the invention, once the multimedia data packet or packets have been placed in the correction matrix M, step E7 is executed. In the course of this step, an indication relating to the location of the multimedia data packets in the correction matrix M is stored in the header of the multimedia data packets.

The phase PH1 of creating the correction matrix is executed as many times as necessary to fill the correction matrix M.

An exemplary correction matrix M of dimensions 4×4 obtained in accordance with the method previously described is given by:

$$M = \begin{bmatrix} P_1 & P_2 & Q_1 & P_3 \\ Q_2 & Q_3 & P_4 & Q_4 \\ P_5 & P_6 & P_7 & P_8 \\ Q_5 & P_9 & Q_6 & P_{10} \end{bmatrix}$$

Where $P_j$ represents a multimedia data packet and $Q_m$ represents an empty location such as defined in step E9.

When a multimedia data packet is generated by the sending device, it is allocated a sequence number which makes it possible to identify it. Two multimedia data packets sent consecutively have successive sequence numbers.

Once the correction matrix has been created, correction data packets are determined on the basis of groups of multimedia data packets. Such groups correspond to the multimedia data packets constituting rows or columns of the correction matrix M. Whether or not a data packet belongs to a group of multimedia data is verified by its sequence number.

Thus for each row of the data correction matrix M, a logical operator is applied to the various multimedia data packets. The result thus obtained constitutes the correction data packet corresponding to the row of the matrix processed. Such an operation is applied, in a first embodiment of the invention, to all the rows of the correction matrix M. In a second embodiment, such an operation is applied to all the columns of the correction matrix M. Finally in a third embodiment, this operation is applied to all the rows and to all the columns of the correction matrix M.

An example of a logical operator used to generate the correction data packets is the exclusive OR or XOR operator, represented by the symbol ** and whose truth table is:

| A | B | A ⊕ B |
|---|---|-------|
| 0 | 0 | 0 |
| 0 | 1 | 1 |
| 1 | 0 | 1 |
| 1 | 1 | 0 |

Thus applied to the multimedia data packets $P_1$, $P_2$ and $P_3$ belonging to the first row of the correction matrix M the exclusive OR operator makes it possible to obtain the correction data packet $D_1$:

$$\begin{array}{cccccc} P_1 & \oplus & P_2 & \oplus & P_3 & = D_1 \\ 1101 & & 1101 & & 0011 & \phantom{=}0011 \end{array}$$

in this exemplary application the multimedia data packets are coded on four bits.

The association of the correction data packets with the corresponding multimedia data packets can be represented in the following manner:

$$M = \begin{bmatrix} P_1 & P_2 & Q_1 & P_3 \\ Q_2 & Q_3 & P_4 & Q_4 \\ P_5 & P_6 & P_7 & P_8 \\ Q_5 & P_9 & Q_6 & P_{10} \end{bmatrix} \begin{matrix} D_1 \\ D_2 \\ D_3 \\ D_4 \end{matrix}$$
$$\phantom{M = }D'_1 \; D'_2 \; D'_3 \; D'_4$$

Where $D_n$ represent the correction data packets associated with the n rows of the error correction matrix M and $D'_p$ the correction data packets associated with the p columns of the error correction matrix M.

Once the error correction matrix M has been created, and the correction data packets have been generated, the multimedia data packets are sent by the sender terminal 1 to a plurality of receiver terminals $2_i$. This constitutes a first data stream. The correction data packets are sent separately by the sender terminal 1, thus constituting a second and/or a third data stream distinct from the first, according to the embodiment implemented.

Indeed, the correction data packets corresponding to the rows of the correction matrix M and the correction data packets corresponding to the columns of the correction matrix M form the subject of separate streams. Each correction data packet contains, stored in its header, indications about the empty locations of the row or column of the data correction matrix to which it corresponds. In this embodiment, the indications relating to the location of the multimedia data packets in the correction matrix are stored in the header of these multimedia data packets.

In a second embodiment of the invention, the correction data packets comprise also stored in their header indications relating to the location of the multimedia data packets in the correction matrix M, these indications now no longer being stored in the header of the multimedia data packets.

In the first embodiment, the indications relating to the location of the multimedia data packets contained in the header of the multimedia data packets are for example the coordinates of the multimedia data packet in the correction matrix, that is to say, a row number and a column number. Another exemplary indication relating to the location of a multimedia data packet in the correction matrix is the sequence number of the first multimedia data packet of the row or of the column of the correction matrix and the number of locations which separate the multimedia data packet from the first multimedia data packet of the row or of the column.

Concerning the indications about the empty locations, contained in the correction data packets, they are for example coordinates in the correction matrix.

In the second embodiment, the indications relating to the location of multimedia data packets and to the empty locations in the correction matrix, contained in the header of the correction data packets, are for example the sequence number of the first multimedia data packet of the row or of the column of the correction matrix and an ordered list of the sequence numbers of the multimedia data packets belonging to the row or to the column as a function of their position in the latter. In this ordered list, the empty locations are represented by a number coded in hexadecimal, for example the number FF. Thus the presence of the number FF between two sequence numbers signifies that the two multimedia data packets identified by these sequence numbers are separated by an empty location in the correction matrix.

On receipt of the first and second and/or third data stream, a receiver terminal $2_i$ implements a method of reconstructing the correction matrix M.

Figure 3:
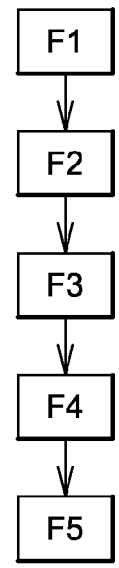

With reference to FIG. 3, in the course of a step F1, the receiver terminal $2_i$ receives multimedia data packets and the correction data packets.

In the course of a step F2, the multimedia data packets received are placed in a matrix M' which is the reconstruction of the correction matrix M created by the sender terminal 1. The multimedia data packets are placed in the reconstructed matrix M' with the aid of the indications about their location in the correction matrix M which are contained in their header or in the header of the associated correction data packets depending on whether the first or the second embodiment is implemented.

On completion of this step a first version of the reconstructed matrix M' is obtained:

$$M' = \begin{bmatrix} P_1 & P_2 & & \\ & & P_4 & \\ P_5 & & & P_8 \\ & P_9 & & \end{bmatrix}$$

The correction data packets are processed by the receiver terminal $2_i$, in the course of a step F3. These correction data packets contain stored in their header indications about the empty locations of the rows and/or of the columns of the correction matrix M.

It is possible to identify the multimedia data packets lost during the transmission of the data streams between the sender terminal 1 and the receiver terminal $2_i$, as well as their location in the correction matrix M with the aid of their sequence number and of the indications about the empty locations.

Once the lost multimedia data packets have been identified, the reconstructed matrix M' is completed in the course of a step F4, so that by the end of this step the definitive reconstructed matrix M' is obtained and can be represented as follows, still with reference to our example:

$$M' = \begin{bmatrix} P_1 & P_2 & Q_1 & V \\ Q_2 & Q_3 & P_4 & Q_4 \\ P_5 & V & V & P_8 \\ Q_5 & P_9 & Q_6 & V \end{bmatrix}$$

where V indicates a location not corresponding to an empty location of the correction matrix M and for which no multimedia data packet has been received.

Once the lost multimedia data packets have been identified, the correction data packets to be used to regenerate the lost information are in their turn identified.

In order to regenerate the lost information, a logical operator is applied to the various multimedia data packets present in the reconstructed matrix M' and belonging to the same row or to the same column as the lost multimedia data packet as well as to the corresponding correction data packet. The logical operator used is the same as that which was used to generate the correction data packet. The result thus obtained corresponds to the lost multimedia data packet.

Let us return to the example of the multimedia data packets $P_1$, $P_2$ and $P_3$ belonging to the first row of the correction matrix M. It is seen in the reconstructed matrix M' that the multimedia data packet $P_3$ has been lost during transmission. In order to regenerate the information that it contains, the exclusive OR operator is applied to the multimedia data packets $P_1$ and $P_2$ which have been received by the receiver terminal $2_i$, as well as to the correction data packet D1 corresponding to the first row of the correction matrix M:

$$P_1 \oplus P_2 \oplus D_1 = P_3$$
$$1101 \quad 1101 \quad 0011 \quad 0011.$$

Proceeding in this way for each lost multimedia data packet, it is possible to regenerate the lost information and thus ensure satisfactory quality of service, knowing that a correction data packet corresponding to a row of the correction matrix M' can only correct the loss of an element of this row and that a correction data packet corresponding to a column of the correction matrix M' can only correct the loss of an element of this column.

Figure 4:
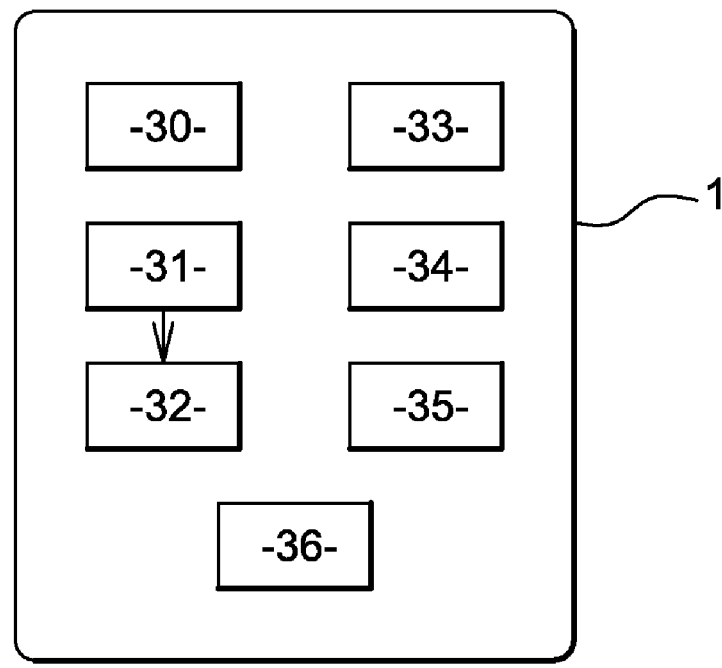

A sender terminal 1 emitting multimedia data packets implementing the method of creating a correction matrix according to an embodiment of the invention is represented in FIG. 4.

Such a sender terminal 1 comprises means 30 for determining the dimensions of the correction matrix M as a function of the maximum rate at which the multimedia data packets are sent by the sending device. Such a terminal also comprises means 31 for determining the value of the time slot Δt corresponding to the time interval separating the generation of two consecutive multimedia data packets by the sending device when the rate at which the multimedia data packets are sent by the sending device is a maximum. This value is in a counter 32. The multimedia data packets thus received are placed in the correction matrix M with the aid of placing means 34 every Δt. Once the correction matrix M has been created, the correction data packets are generated by correction data packet generating means 35.

The multimedia data packets and the correction data packets are thereafter sent to a plurality of receiver terminals $2_i$ by sending means 36 of the sender terminal 1.

Figure 5:
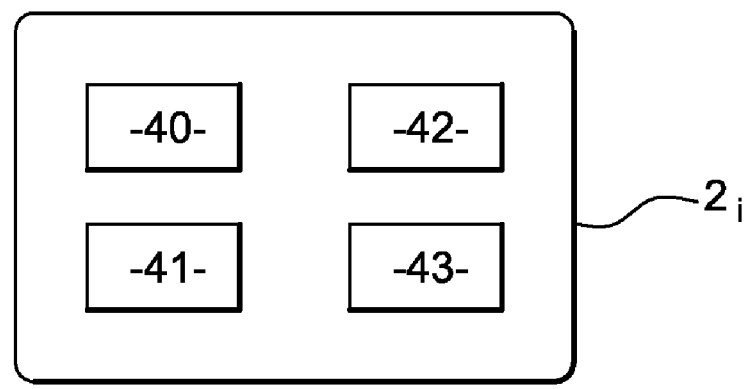

A receiver terminal $2_i$ implementing the method of reconstructing the correction matrix which is the subject of an embodiment of the invention is represented in FIG. 5. Such a receiver terminal $2_i$ comprises reception means 40 able to receive the multimedia data packets and the correction data packets sent by the sender terminal 1. Once received, the multimedia data packets are placed in a reconstructed matrix M' with the aid of placing means 41. These placing means 41 position the multimedia data packets in the reconstructed matrix M' on the basis of indications about the location of the multimedia data packets in the correction matrix M, contained in the header of the multimedia data packets or in the header of the correction data packets according to the embodiment of the invention implemented. Determination means 42 make it possible to identify, in the reconstructed matrix M', the multimedia data packets lost during transmission. Correction means 43 of the receiver terminal Z make it possible to regenerate the multimedia data packets lost with the aid of the corresponding correction data packets.

Finally, the subject of an embodiment of the invention is also a computer program, in particular a computer program on or in an information medium or memory, suitable for implementing an embodiment of the invention. This program can use any programming language, and be in the form of source code, object code, or of code intermediate between source code and object code such as in a partially compiled form, or in any other desirable form for implementing a method according to an embodiment of the invention.

The information medium can be any entity or device capable of storing the program. For example, the medium can comprise a storage means, such as a ROM, for example a CDROM or a microelectronic circuit ROM, or else a magnetic recording means, for example a diskette (floppy disk) or a hard disk.

Moreover, the information medium can be a transmissible medium such as an electrical or optical signal, which can be forwarded via an electrical or optical cable, by radio or by other means. The program according to an embodiment of the invention can in particular be downloaded from a network of Internet type.

Although the present disclosure has been described with reference to one or more examples, workers skilled in the art will recognize that changes may be made in form and detail without departing from the scope of the disclosure and/or the appended claims.

The invention claimed is:

1. A method comprising:
creating a correction matrix for correcting errors of multimedia data packets transmitted at a non-constant rate between a sender terminal and at least one receiver terminal, said multimedia data packets constituting elements of said correction matrix, wherein the correction matrix has dimensions which are determined as a function of a maximum rate of said multimedia data packets at the input of said sender terminal; and
placing said multimedia data packets in the correction matrix at regular time slots, wherein a noted absence of any multimedia data packets for a given time slot is represented in said correction matrix by an empty location.

2. The method as claimed in claim 1, said method comprising:
a step of generating correction data packets on the basis of said multimedia data packets placed in said correction matrix; and
a step of sending at least one message comprising at least one of said correction data packets and an indication about the empty locations and an indication about the location of said multimedia data packets in the correction matrix.

3. The method as claimed in claim 1, said method comprising:
a step of generating correction data packets on the basis of said multimedia data packets placed in said correction matrix;
a step of sending at least one first message comprising at least one of said correction data packets and an indication about the empty locations in the correction matrix; and
a step of sending at least one second message comprising at least one of said multimedia data packets and an indication about the location of said at least one multimedia data packet in the correction matrix.

4. The method as claimed in claim 1, wherein when several multimedia data packets are sent in one and the same time slot, said multimedia data packets are placed simultaneously in adjacent locations of the correction matrix.

5. A method of reconstructing a correction matrix for correcting errors of transmission of multimedia data packets at a non-constant rate between a sender terminal and at least one receiver terminal, said method comprising:
a step of placing said multimedia data packets so as to reconstruct said correction matrix,
prior to the placing step, a step of reception by said receiver terminal of at least one message comprising an indication about the location of the multimedia data packets and an indication about empty locations corresponding to an absence of multimedia data packets in the correction matrix.

6. The method as claimed in claim 5, wherein said message received also comprises at least one correction data packet, said correction data packet being generated on the basis of the multimedia data packets sent by the sender terminal.

7. The method as claimed in claim 5, wherein during the reception step, the receiver terminal receives a first message comprising at least one correction data packet, said correction data packet being generated on the basis of the multimedia data packets sent by the sender terminal, and an indication about the empty locations in the correction matrix, and a second message comprising at least one of said multimedia data packets and an indication about the location of said at least one multimedia data packet in the correction matrix.

8. A sender terminal configured to emit multimedia data packets at a non-constant rate, said sender terminal comprising:
  means for creating a correction matrix for correcting errors of transmission of the multimedia data packets between said sender terminal and at least one receiver terminal, said multimedia data packets constituting elements of said correction matrix,
  means for determining dimensions of the correction matrix as a function of a maximum rate of said multimedia data packets, and
  means for placing said multimedia data packets in the correction matrix at regular time slots, the absence of data packets resulting in an empty location in said correction matrix.

9. The sender terminal as claimed in claim 8, said terminal comprising:
  means for generating correction data packets on the basis of said multimedia data packets placed in said correction matrix, and
  means for sending at least one message comprising at least one of said correction data packets and an indication about the empty locations and an indication about the location of said multimedia data packets in the correction matrix.

10. The sender terminal as claimed in claim 8, said terminal comprising:
  means for generating correction data packets on the basis of said multimedia data packets placed in said correction matrix,
  means for sending at least one first message comprising at least one of said correction data packets and an indication about the empty locations in the correction matrix, and
  means for sending at least one second message comprising at least one of said multimedia data packets and an indication about the location of said at least one multimedia data packet in the correction matrix.

11. A receiver terminal configured to receive multimedia data packets at a non-constant rate, said receiver terminal comprising:
  means for reconstructing a correction matrix for correcting errors of transmission of said multimedia data packets between a sender terminal and said receiver terminal,
  means for placing said multimedia data packets so as to reconstruct said correction matrix,
  means for receiving at least one message comprising an indication about the location of the multimedia data packets, and an indication about empty locations corresponding to an absence of multimedia data packets in the correction matrix.

12. The receiver terminal as claimed in claim 11, the receiver terminal comprises;
  means for receiving a first message comprising at least one correction data packet, said correction data packet being generated on the basis of the multimedia data packets sent by the sender terminal, and an indication about the empty locations in the correction matrix, and
  means for receiving a second message comprising at least one of said multimedia data packets and an indication about the location of said at least one multimedia data packet in the correction matrix.

13. A method comprising:
  generating a message comprising an indication about a location of elements and an indication about empty locations corresponding to an absence of elements in a matrix for correcting errors of the transmission of multimedia data packets at a non-constant rate between the sender terminal and the receiver terminal, said multimedia data packets constituting the elements of said correction matrix; and
  transmitting the message from the sender terminal to at least one receiver terminal.

14. A computer program stored on a computer-readable memory and comprising program code instructions for execution of 4 a method when said program is executed by a processor, the method comprising:
  creating a correction matrix for correcting errors of multimedia data packets transmitted at a non-constant rate between a sender terminal and at least one receiver terminal, said multimedia data packets constituting elements of said correction matrix, wherein the correction matrix has dimensions which are determined as a function of a maximum rate of said multimedia data packets at the input of said sender terminal; and
  placing said multimedia data packets in the correction matrix at regular time slots, wherein a noted absence of any multimedia data packets for a given time slot is represented in said correction matrix by an empty location.

15. A computer program stored on a computer-readable memory and comprising program code instructions for execution of a method of reconstructing a correction matrix for correcting errors of transmission of multimedia data packets at a non-constant rate between a sender terminal and at least one receiver terminal, when said program is executed by a processor, said method comprising:
  a step of placing said multimedia data packets so as to reconstruct said correction matrix,
  prior to the placing step, a step of reception by said receiver terminal of at least one message comprising an indication about the location of the multimedia data packets and an indication about empty locations corresponding to an absence of multimedia data packets in the correction matrix.

* * * * *